(12) United States Patent
Aue

(10) Patent No.: US 8,271,869 B2
(45) Date of Patent: Sep. 18, 2012

(54) IDENTIFYING LANGUAGE TRANSLATIONS FOR SOURCE DOCUMENTS USING LINKS

(75) Inventor: Anthony Aue, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 144 days.

(21) Appl. No.: 12/900,490

(22) Filed: Oct. 8, 2010

(65) Prior Publication Data

US 2012/0089898 A1    Apr. 12, 2012

(51) Int. Cl.
G06F 17/28 (2006.01)
G06F 17/30 (2006.01)
(52) U.S. Cl. ......... 715/234; 715/206; 707/761; 707/800
(58) Field of Classification Search ............... 715/206, 715/234, 265
See application file for complete search history.

(56) References Cited

U.S. PATENT DOCUMENTS

| | | | | |
|---|---|---|---|---|
| 7,383,320 | B1 * | 6/2008 | Silberstein et al. | 709/219 |
| 7,711,682 | B2 | 5/2010 | Zhang | |
| 7,996,402 | B1 * | 8/2011 | Gravano et al. | 707/736 |
| 2007/0250306 | A1 * | 10/2007 | Marcu et al. | 704/9 |
| 2008/0010056 | A1 | 1/2008 | Zhou et al. | |
| 2008/0126076 | A1 * | 5/2008 | Ming et al. | 704/4 |
| 2008/0162425 | A1 * | 7/2008 | Grennan et al. | 707/3 |
| 2008/0168049 | A1 | 7/2008 | Gao et al. | |

OTHER PUBLICATIONS

Li, et al., "Mining Parallel Text from the Web based on Sentence Alignment", Retrieved at <<—Published Date: 2007 http://dspace. wul.waseda.ac.jp/dspace/bitstream/2065/29103/1/PACLIC_21_00_029_Li.pdf >>, pp. 285-292.

Nakayama, et al., "Wikipedia Mining Wikipedia as a Corpus for Knowledge Extraction", Retrieved at << http://www.wikipedia-lab.org/en/images/0/06/Wikimania2008.pdf >>, 2008, pp. 15.

Hu, et al., "Mining Translations of Web Queries from Web Click-through Data", Retrieved at << http://aaaipress.org/Papers/AAAI/2008/AAAI08-181.pdf >>, 2008, pp. 1144-1149.

Talvensaari, et al., "Focused Web Crawling in the Acquisition of Comparable Corpora", Retrieved at << http://kastanja.uta.fi/tutkimus/fire/archive/2008/FocuCrawl-IRJ'08.pdf >>, Feb. 25, 2008, pp. 23.

Chien, et al., "LiveTrans—Cross-Language Web Search through Live Mining of Query Translations", Retrieved at << http://www.iis.sinica.edu.tw/APECO2/Program/Ifchien.doc >>, 2004, pp. 9.

Zhang, et al., "Automatic Acquisition of Chinese-English Parallel Corpus from the Web", Retrieved at << http://research.microsoft.com/en-us/um/people/jfgao/paper/ecir_yzhang_69.pdf >>, Mar. 28, 2006, pp. 12.

(Continued)

*Primary Examiner* — Doug Hutton, Jr.
*Assistant Examiner* — Ariel Mercado

(57) ABSTRACT

Technology is described for identifying language translations for source documents. The method includes finding source documents containing links to target documents and the link anchors of the links have language indicating text. A first tuple set can be generated for paired source documents and target documents with an expected target language for a target document. The first tuple set can be annotated with primary languages for the source documents and target documents to form a second tuple set where primary languages of the source documents and target documents are different. Further, a third tuple set can be generated using the second tuple set using a count of the number of times source documents and target documents occur in the first tuple set. Tuples can be removed from the third tuple set where a count ratio between source document count and target document count is less than a reference ratio.

18 Claims, 7 Drawing Sheets

S5 Tuples

| Source URL | Target URL | Expected Target Language | Source Language | Target Language | Source Count | Target Count | |
|---|---|---|---|---|---|---|---|
| http://some.domain.com/some/path/page1.html | http://some.domain.com/some/otherpath/page5.html | German | English | German | 1 | 1 | |
| http://some.domain.com/really/really/long/path/name/page2.html | http://some.domain.com/germanpage.html | German | English | German | 1 | 1 | Separator Ratio Too Low |
| http://some.domain.com/some/path/page7.html | http://some.domain.com/catchall_german_page | German | English | German | 1 | 2 | URL Ratio |
| http://some.domain.com/some/path/page2.html | http://some.domain.com/catchall_german_page | German | English | German | 1 | 2 | URL Ratio |

OTHER PUBLICATIONS

Resnick, Philip, "Parallel Strands: A Preliminary Investigation into Mining the Web for Bilingual Text", Retrieved at <<http://arxiv.org/PS_cache/cmp-lg/pdf/9808/9808003v1.pdf>>, Aug. 7, 1998, pp. 11.

* cited by examiner

| Source URL | Target URL | Expected Target Language |
|---|---|---|
| http://some.domain.com/some/path/page1.html | http://some.domain.com/some/otherpath/page5.html | German |

FIG. 2a

| Source URL | Target URL | Expected Target Language | Source Language | Target Language |
|---|---|---|---|---|
| http://some.domain.com/some/path/page1.html | http://some.domain.com/some/otherpath/page5.html | German | English | German |

FIG. 2b

| Source URL | Target URL | Expected Target Language | Source Language | Target Language | Source Count | Target Count |
|---|---|---|---|---|---|---|
| http://some.domain.com/some/path/page1.html | http://some.domain.com/some/otherpath/page5.html | German | English | German | 1 | 1 |

FIG. 2c

S1 Tuples

| Source URL | Target URL | Expected Target Language |
|---|---|---|
| http://some.domain.com/some/path/page1.html | http://some.domain.com/some/otherpath/page5.html | German |
| http://some.domain.com/really/really/long/path/name/page2.html | http://some.domain.com/germanpage.html | German |
| http://some.domain.com/some/path/page7.html | http://some.domain.com/catchall_german_page | German |
| http://some.domain.com/some/path/page2.html | http://some.domain.com/catchall_german_page | German |
| http://some.domain.com/some/path/page3.html | http://some.domain.com/some/path/page6.html | German |
| http://some.domain.com/some/path/page4.html | http://some.domain.com/some/path/page5.html | German |

FIG. 4

S2 Tuples

| Source URL | Target URL | Expected Target Language | Source Language | Target Language |
|---|---|---|---|---|
| http://some.domain.com/some/path/page1.html | http://some.domain.com/some/otherpath/page5.html | German | English | German |
| http://some.domain.com/really/really/long/path/name/page2.html | http://some.domain.com/germanpage.html | German | English | German |
| http://some.domain.com/some/path/page7.html | http://some.domain.com/catchall_german_page | German | English | German |
| http://some.domain.com/some/path/page2.html | http://some.domain.com/catchall_german_page | German | English | German |
| ~~http://some.domain.com/some/path/page3.html~~ | ~~http://some.domain.com/some/path/page6.html~~ | ~~German~~ | ~~German~~ | ~~German~~ |
| ~~http://some.domain.com/some/path/page4.html~~ | ~~http://some.domain.com/some/path/page5.html~~ | ~~German~~ | ~~English~~ | ~~French~~ |

Wrong Language (502)  
Same Language (504)

FIG. 5

S3 Tuples

| URL | Count |
|---|---|
| http://some.domain.com/some/path/page1.html | 1 |
| http://some.domain.com/really/really/long/path/name/page2.html | 1 |
| http://some.domain.com/some/path/page7.html | 1 |
| http://some.domain.com/some/path/page2.html | 1 |
| http://some.domain.com/germanpage.html | 1 |
| http://some.domain.com/catchall_german_page | 2 |

FIG. 6

S4 Tuples

| Source URL | Target URL | Expected Target Language | Source Language | Target Language | Source Count | Target Count |
|---|---|---|---|---|---|---|
| http://some.domain.com/some/path/page1.html | http://some.domain.com/some/otherpath/page5.html | German | English | German | 1 | 1 |
| http://some.domain.com/really/really/long/path/name/page2.html | http://some.domain.com/germanpage.html | German | English | German | 1 | 1 |
| http://some.domain.com/some/path/page7.html | http://some.domain.com/catchall_german_page | German | English | German | 1 | 2 |
| http://some.domain.com/some/path/page2.html | http://some.domain.com/catchall_german_page | German | English | German | 1 | 2 |

FIG. 7

S5 Tuples

| Source URL | Target URL | Expected Target Language | Source Language | Target Language | Source Count | Target Count | |
|---|---|---|---|---|---|---|---|
| http://some.domain.com/some/path/page1.html | http://some.domain.com/some/otherpath/page5.html | German | English | German | 1 | 1 | |
| ~~http://some.domain.com/really/really/long/path/name/page2.html~~ | ~~http://some.domain.com/germanpage.html~~ | ~~German~~ | ~~English~~ | ~~German~~ | ~~1~~ | ~~1~~ | Separator Ratio Too Low |
| ~~http://some.domain.com/some/path/page7.html~~ | ~~http://some.domain.com/catchall_german_page~~ | ~~German~~ | ~~English~~ | ~~German~~ | ~~1~~ | ~~2~~ | URL Ratio |
| ~~http://some.domain.com/some/path/page2.html~~ | ~~http://some.domain.com/catchall_german_page~~ | ~~German~~ | ~~English~~ | ~~German~~ | ~~1~~ | ~~2~~ | URL Ratio |

FIG. 8

IDENTIFYING LANGUAGE TRANSLATIONS FOR SOURCE DOCUMENTS USING LINKS

BACKGROUND

The availability of some bilingual, machine-readable texts has stimulated interest in processes for extracting linguistically valuable information from such parallel translated texts. In recent years there has been interest in training statistical machine learning systems to translate a source text in a different language. For example, a statistical translation device may obtain pairs of aligned sentences from parallel corpora. Sometimes obtaining aligned pairs of sentences is even possible without even inspecting the words that the sentences contain by inspecting the number of words that the sentences contain or the number of characters the sentences contain. Accordingly, statistical methods can be successful in achieving useful translation goals.

The translation of text from one human language to another by a computer can be performed using a statistical machine translation tool that learns how to translate languages from statistically analyzing vast amounts of source documents along with the source documents' human created translations in a different language. Statistical machine translation systems typically use a large body or corpus of parallel documents that have been translated by a human for training the statistical models being used. However, a limited number of preexisting bodies of translated documents are available. Even these existing bodies of translated documents are expensive to acquire and are often bound by restrictive licenses.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter. While certain disadvantages of prior technologies are noted above, the claimed subject matter is not to be limited to implementations that solve any or all of the noted disadvantages of the prior technologies.

Various embodiments are described for identifying language translations for source documents. The method can include the operation of finding source documents containing links to target documents and link anchors that have language indicating text. A first tuple set can then be generated for paired source documents and target documents, and the tuples can have an expected target language for a target document. The first tuple set can be annotated with primary languages for the source documents and target documents to form a second tuple set containing tuples where primary languages of the source documents and target documents are different. A third tuple set can be generated using the second tuple set by including a count of a number of times unique link addresses for source documents and target documents occur in the first tuple set. An additional operation is removing tuples from the third tuple set containing pairs of source documents and target documents where a count ratio between a source document count and a target document count is less than a reference ratio.

In another example, a system is provided for pairing source documents with translated target documents. The system can include a link mining module to find source documents containing links to target documents. The link anchors of the links can have language-indicating text for the target documents. A tuple generation module can generate a first tuple set for corresponding source document and target document pairs along with an expected target language of a translated target document. An annotation module can annotate the first tuple set with a primary language for the source documents and the target documents and form a second tuple set containing tuples where the primary languages of the source and target documents are different. In addition, a link count module can generate a third tuple set using the second tuple set by including a count for a number of times each unique link address for source documents and target documents occurs in the first tuple set. Further, a filtering module can remove tuples from the third tuple set containing pairs of source documents and target documents where a count ratio between a source document count and a target document count is less than a reference ratio. In addition, the system may remove tuples from the third tuple set where the count ratio of directory separators of the source document uniform resource locator (URL) as compared to the target document uniform resource locator (URL) is less than a separator threshold. The filtering module can extract document pairs from the third tuple set to provide a list of target documents that can be translations of the source documents.

BRIEF DESCRIPTION OF THE DRAWINGS

FIGS. 2a-2c illustrate examples of tuples that may be used in the method of FIG. 1.

FIG. 4 illustrates an example of a first tuple set used in the method of FIG. 3.

FIG. 5 illustrates an example of a second tuple set used in the method of FIG. 3.

FIG. 6 illustrates an example of a third tuple set used in the method of FIG. 3.

FIG. 7 illustrates an example of a fourth tuple set used in the method of FIG. 3.

FIG. 8 illustrates an example of a fifth tuple set used in the method of FIG. 3.

DETAILED DESCRIPTION

Figure 1:
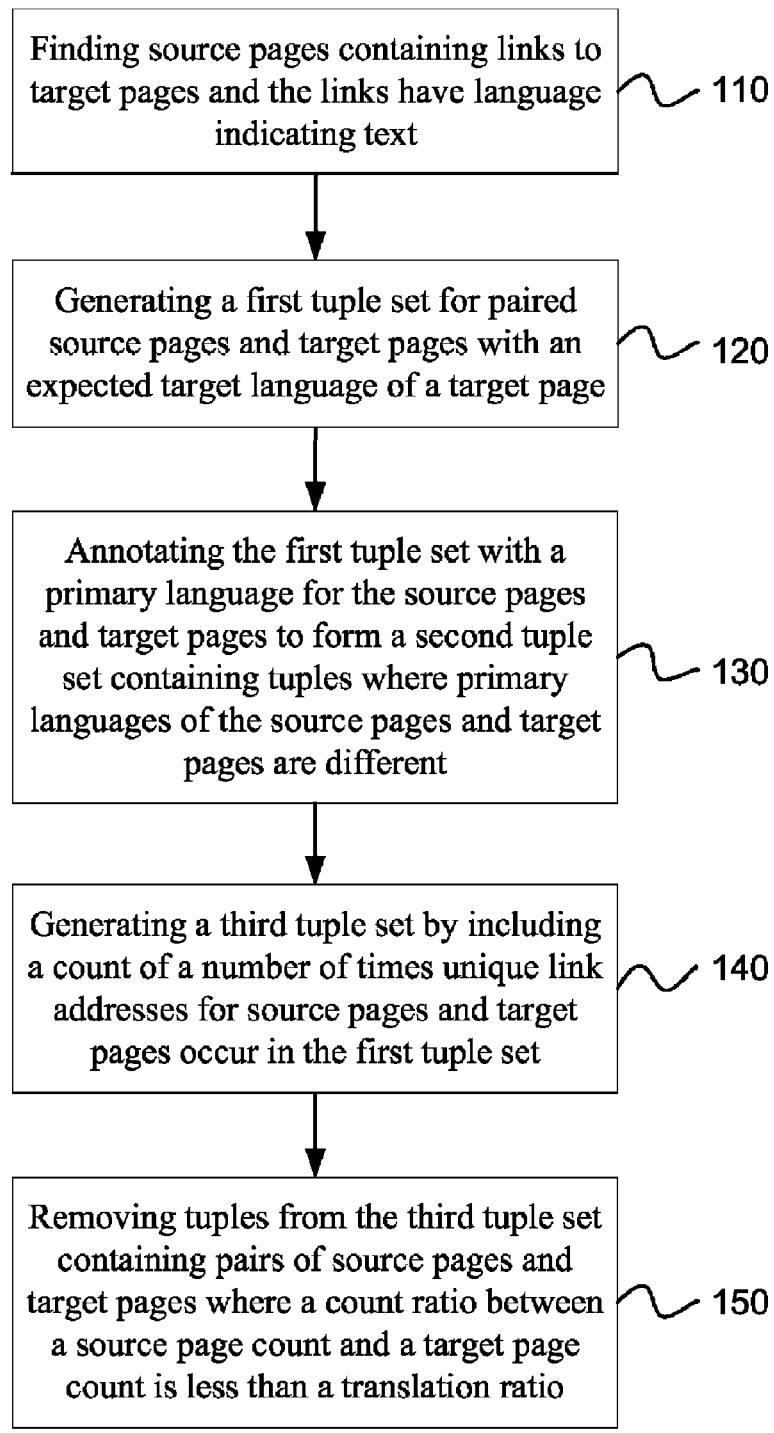
FIG. 1 is a block diagram illustrating an example of a method for identifying language translations for source documents.

Reference will now be made to the exemplary embodiments illustrated in the drawings, and specific language will be used herein to describe the same. It will nevertheless be understood that no limitation of the scope of the technology is thereby intended. Alterations and further modifications of the features illustrated herein, and additional applications of the embodiments as illustrated herein, which would occur to one skilled in the relevant art and having possession of this disclosure, are to be considered within the scope of the description.

Large bodies of human translated, parallel text documents can be obtained from web documents that exist on the internet. Such documents have few or no restrictions associated with the use of the web documents. One challenge can be identifying translated target documents that are actually translations of source documents instead of target documents that are catch-all generic translations in a website for groups of documents or even a catch-all translation for an entire website.

Being able to identify target documents that are believed to be translations of source documents using lists of URL (uniform resource locator) pairs to find translation candidates, without looking at the content of the documents, can be valuable. A system can analyze documents that have a similar URL depth and string structure to find documents or web documents that are deemed to be translations of one another. This process disregards that many target documents may be actual translations of a source document but do not have a similar URL structure or depth.

Instead of just using URLs, the present technology can examine the document, document links, and anchor text in links between documents. If a source document links to a target document with the anchor text "German" in the URL, and the source document is in English and the target document is in German, then the target document may well be a German translation of the source document.

An example method can identify language translations for source documents, as illustrated in FIG. 1. The method can include the operation of finding source documents containing link anchors to target documents, as in block 110. The link anchors can have language indicating text that indicates the translation language of the target document that can be reached from the source document. For example, a French source document may have a link anchor to an English translation of the French document and the language indicating text in the link anchor may be the string "English." These source documents and target documents can be collected by using web crawling robot programs or web bots that traverse the web and/or internet looking for documents that have a translation link in a source document.

Another operation in the method is generating a first tuple set for paired source documents and target documents. The tuples in the first tuple set can also have an expected target language of a target document, as in block 120. The language containing text may contain the name of a language such as "Russian" and this can be the expected target language for the target document. The terms document, document, text source, text object and web document can be used interchangeably with one another to represent linked language documents that can be accessed but the term "document" will be used more frequently in this discussion. The source documents and target documents can be web documents or other text documents available on the internet or the documents can be URL accessed documents that can be accessed through a local network.

The first tuple set can be annotated with primary languages for the source documents and target documents to form a second tuple set containing tuples where primary languages of the source documents and target documents are different, as in block 130. The source documents and target documents can be analyzed with a language discovery tool which can determine the type of language actually contained in the documents or documents. Thus, a check may be made of whether the languages in the source documents and target documents are actually different languages. If the language for the documents is analyzed as being the same, then no translation exists and the documents will not be included in the second tuple set. In other words, the second tuple set may be generated by discarding tuples where the expected source language and the expected target language are identical.

A third tuple set can be generated from the second tuple set by including a count of a number of times unique link addresses for source documents and target documents occur in the first tuple set, as in block 140. Tuples containing pairs of source documents and target documents where a count ratio between a source document count and a target document count is less than a reference ratio can then be removed from the third tuple set, as in block 150. This can leave tuples in the third tuple set that are highly likely to be translation pairs and the target documents remaining in the third tuple list can be identified as translations of the source documents.

The reference ratio can be set to be a pre-determined constant value. For example, the reference ratio can be set to a constant such as 0.6 and when the count ratio between the source document count and the target document count is less than the reference ratio then that tuple can be removed because the source document points at a target document that is pointed to by a number of other documents and thus the target document is not a unique translation document. To continue the example, when the count ratio between the source document and target document is one to one, then the count ratio of one exceeds the reference ratio constant of 0.6 and the tuple can be kept in the tuple set. On the other hand, if the count ratio between the source document and target document is one-to-three or 0.33 which is less than the reference ratio then the tuple can be removed because the source document points to a translation document that is being referenced three times and the target document is not likely to be a direct translation of the source document.

In an alternative configuration, each tuple in the third tuple set may include a single source or target document URL with a count of the number of times the URL has been referenced by other documents. The term reference primarily refers to source documents that reference target documents but can also include source documents that are referenced by other source documents or target documents. Each of these reference cases may generate counts to identify or exclude document pairs as translations.

In another example, tuples may also be removed from the third tuple set with document pairs where the ratio of counts of directory separators in the two URLs is less than a tuneable threshold. Removing URLs where the ratio of counts of directory separators is less than a separator threshold can remove tuple pairs where documents deep in a directory hierarchy link to the root of the translated document site. In other words, a comparison of the depth of the directories in the link can be made and if the difference in the depth between the links is significant, than the tuple pair can be removed.

The document pairs in the final tuple set can be extracted from the third tuple set to provide a list of target documents that are translations of the source documents. These document translation pairs can then be used in training statistical machine learning translation systems.

FIG. 2a illustrates an example of a tuple in the first tuple set for the method of FIG. 1. The tuple in the first tuple set can include a source document URL, a target document URL and an expected target language for a target document. FIG. 2b illustrates an example of a tuple in a second tuple set that contains tuples where the primary languages of the source documents and target documents are different. In addition, FIG. 2c illustrates an example of a tuple in the third tuple set described with respect to FIG. 1. Whether just a few tuple sets are used or many intermediate tuple sets are used in the technology described here, the same end results can be obtained.

Figure 3:
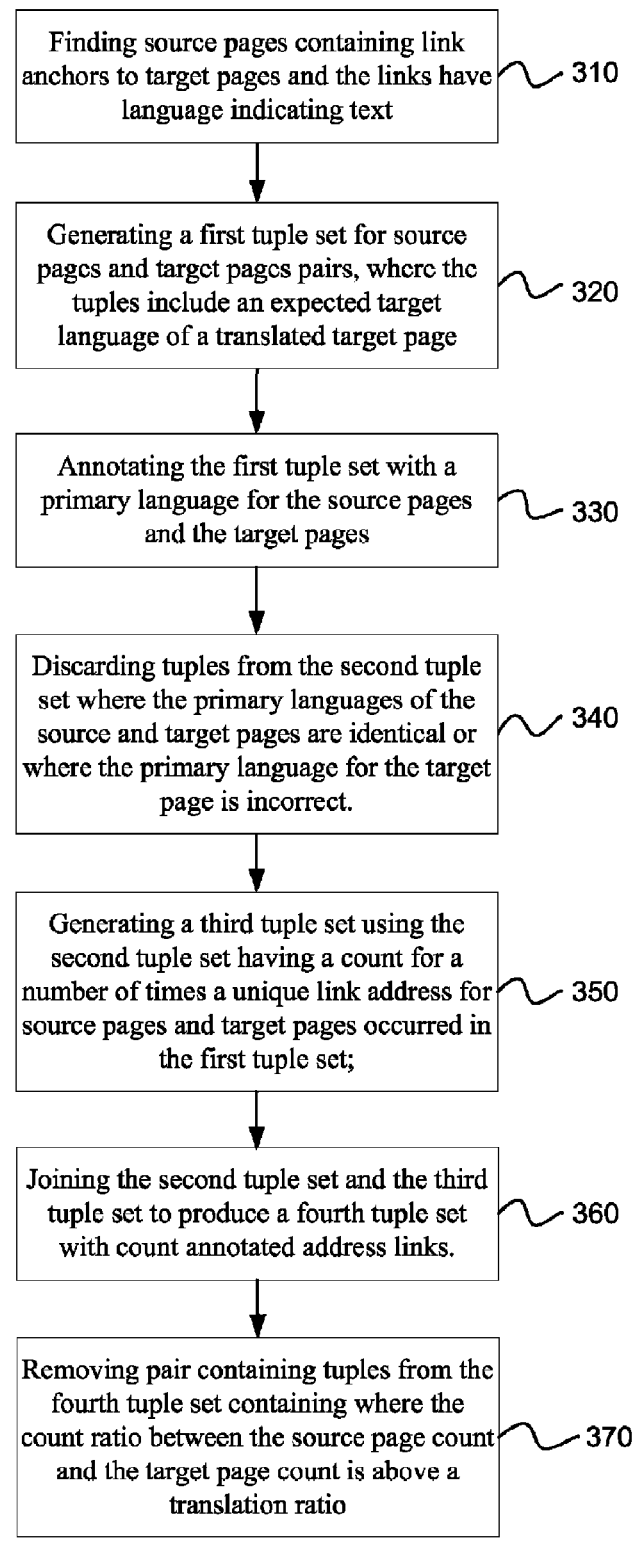
FIG. 3 is a block diagram illustrating an example of a method for identifying language translations for source documents using additional intermediate tuple sets.

Another example of a method of obtaining language translations for source documents is illustrated in FIG. 3. The method of FIG. 3 will now be explained in detail and this explanation will also reference examples of the tuples that may be generated by each step of the method using FIGS. 4-8.

While the discussion of the earlier method illustrated the creation of three tuple sets, these examples show that anywhere from two or even more (e.g. five) tuple sets can be used to arrive at a desired result.

The method can include the operation of finding source documents containing link anchors to target documents and the links have language indicating text, as in block 310 of FIG. 3. In another example, the link can be an image link and the alternative text can be used instead of the link anchor text. The source documents and target documents can be located in a distributed processing environment containing a large portion of the World Wide Web (WWW).

A first tuple set can be generated for source document and target document pairs, as in block 320 of FIG. 3. The tuples can include an expected target language of a translated target document. An example of a first tuple set (S1) is illustrated in FIG. 4. The first tuple set can also be annotated with primary languages for the source documents and the target documents, as in block 330 of FIG. 3. An example of tuples annotated with a primary language for the source and targets documents (S2) is illustrated in FIG. 5.

Tuples from the second tuple set can be discarded where the primary languages of the source and target documents are identical, as in block 340 of FIG. 3. For example, FIG. 5 illustrates a document where the source language of both the source and target documents is "German" 504, and since this is the same language, then such tuples can be discarded. Tuples in the second tuple set can also be discarded where the primary language for the target document is not the same as the expected target language of the target document. FIG. 5 illustrates an example of where the primary language of the target document is not the same as the expected language of the target document 502. As a result, this tuple may be discarded.

A third tuple set can be generated using the second tuple set, and this third tuple set can include a count for a number of times a unique link address for source documents and target documents occurred in the first tuple set, as in block 350 of FIG. 3. An example of the third tuple set (S3) is in FIG. 6 which can show a count for the number of times a unique URL exists in the first tuple set. In other words, this tuple set shows a number of times a target document was being referenced or the number of times the source document was in the first tuple list.

The second tuple set and the third tuple set can be joined to produce a fourth tuple set where the address links are annotated with the counts, as in block 360 of FIG. 3. An example of a fourth tuple set (S4) is illustrated in FIG. 7.

Tuples from the fourth tuple set containing pairs of source documents and target documents can be removed where the count ratio between the source document count and the target document count is above a reference ratio, as in block 370 of FIG. 3. A reference ratio can be set to a pre-determined constant value. Tuples with document pairs may also be removed where the ratio of counts of directory separators in the two URLs is less than a tuneable threshold T1. For instance, removing URLs where the ratio of counts of directory separators is less than a separator threshold removes tuple pairs where web documents deep in a directory hierarchy link to the root of the translated web site. Removing tuples where ratio of counts between the URL pairs is below a translation threshold can result in the tuple set (S5) in FIG. 8. The tuples set in FIG. 8 also shows removed tuples as crossed out for illustration purposes but practically speaking these tuples would not be in the list after some tuples had been removed.

Figure 9:
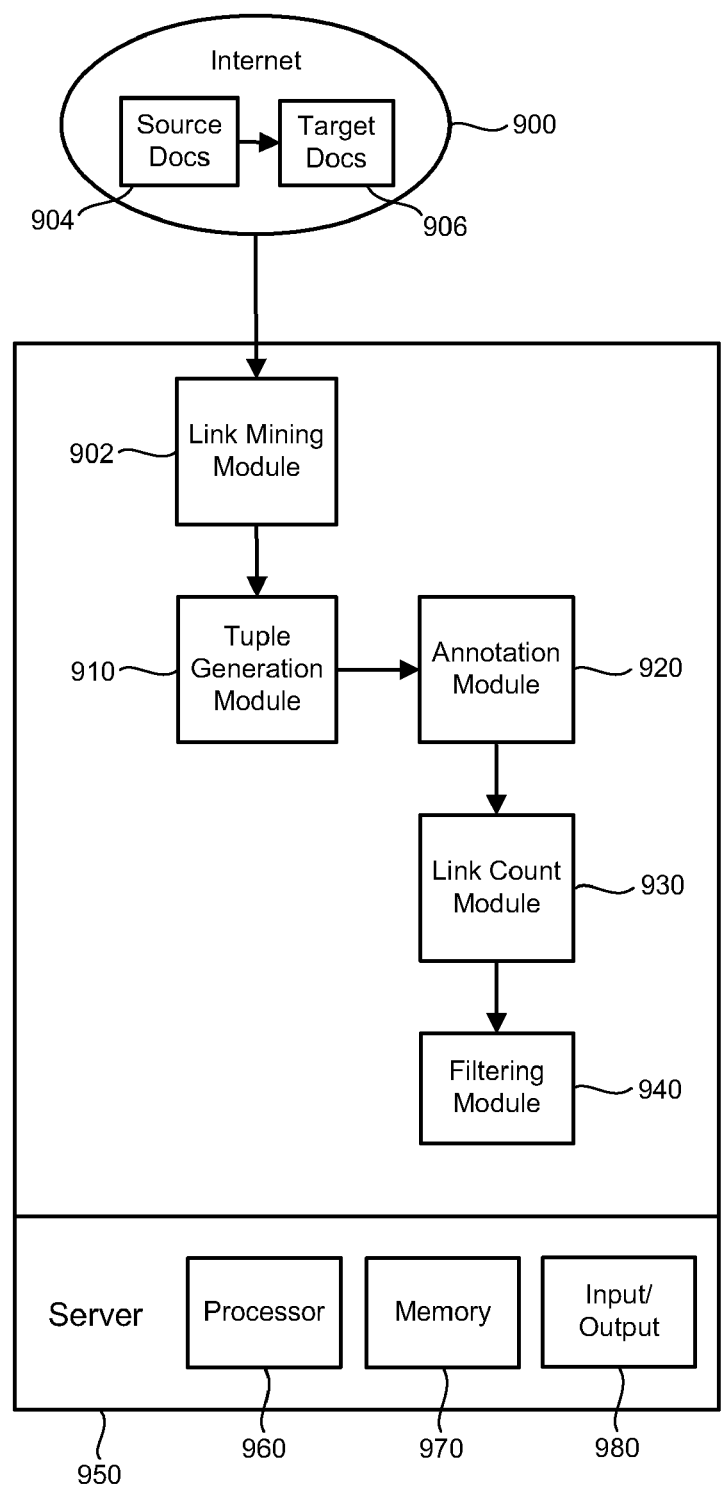
FIG. 9 illustrates an example of system for pairing source documents with translated target documents.

FIG. 9 illustrates a system for pairing source documents with translated target documents. The system may include a link mining module 902 to find source documents 904 containing link anchors to target documents 906. These source and target documents can be web documents from the internet 900, a local network, or other locations with documents that are interlinked with URLs. The link anchors can have language indicating text or anchor text for the target documents. For example, a German web document may contain a link to a human prepared English translation. So, the language indicating text would be "English."

A tuple generation module 910 can generate a first tuple set for corresponding source document and target document pairs. In addition, the tuples in the first tuple set can include an expected target language of a translated target document.

An annotation module 920 can be used to annotate the first tuple set with a primary language for the source documents and the target documents. The annotated tuples can form a second tuple set containing tuples where the primary languages of the source and target documents are different. In one example, the second tuple set can be formed by discarding tuples where the expected source language and the expected target language are identical.

A link count module 930 can generate a third tuple set using the second tuple set by including a count for a number of times each unique link address for source documents and target documents occurs in the first tuple set.

A filtering module 940 can remove tuples from the third tuple set containing pairs of source documents and target documents where a count ratio between a source document count and a target document count is less than a reference ratio. The reference ratio may be set to be a value greater than or equal to one source document to two target documents. For example, the reference ratio may be greater than or equal to one-half (½). Other reference ratios can also be used, as desired. The filtering module can then extract the document pairs from the third tuple set to provide a list of target documents that are identified as translations of the source documents.

The modules described in the system for pairing source documents with translated target documents can be executed on a computer or server 950 having a computing processor 960 and volatile memory (e.g., RAM, SDRAM, etc.) or non-volatile computer memory 970 (e.g., Flash memory, phase change memory, etc.). An input and/or output module 980 can be included to provide the output corpus of paired source documents and translation documents to a statistical machine translation system or an end user. Instructions can also be received from an end user through the input/output module.

An example method for using the system described in FIG. 9 will now be described. The link mining module 902 can find source documents P1 that contain links to target documents with language-indicating anchor text (i.e. "German" or "German Translation"). These links can be passed to the tuple generation module 910, which can emit a first stream of tuples (S1) containing tuples in the form <Url1, Url2, ExpectedTargetLanguage>, where Url1 is the source document (the document containing the link), Url2 is the target document (the document referenced by Url1), and ExpectedTargetLanguage is the language indicated by the anchor text.

The annotation module 920 can process S1 and annotate the URLs with the primary languages for the source and target documents using an automatic language identifier. Any pairs where the primary languages are identical, or where the language of URL2 is not the same as ExpectedTargetLanguage can be discarded. The results of this are tuple stream two (S2).

The link count module 930 can process S2 to create a stream S3 containing tuples <Url, Count>, where URL is a source or target URL (Url1 or Url2 in S2), and Count is the number of times the URL occurred in the first tuple set or the second tuple set.

The tuples from S2 can be joined with S3 to produce tuple set S4, where each URL is annotated with counts. The joining process can take place in the link count module or another module. The filtering module 940 can process S4 to create S5 by throwing out any document pairs for which the ratio of counts of the two URLs is smaller than a tunable threshold T2. Removing these document pairs gets rid of cases where more than one source document links to a "catch-all" target document. Tuples can also be removed where the ratio of counts of directory separators in the two URLs is less than a tuneable threshold T1. Removing URLs where the ratio of counts of directory separators is less than a separator threshold may remove tuple pairs where web documents deep in a directory hierarchy link to the root of the translated web site or another generic translation document. The documents pairs remaining in S5 can be extracted to provide the desired language pairs where the target document is likely to be a translation of the source document.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices. The modules may be passive or active, including agents operable to perform desired functions.

Furthermore, the described features, structures, or characteristics may be combined in any suitable manner in one or more embodiments. In the preceding description, numerous specific details were provided, such as examples of various configurations to provide a thorough understanding of embodiments of the described technology. One skilled in the relevant art will recognize, however, that the technology can be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements can be devised without departing from the spirit and scope of the described technology.

The invention claimed is:

1. A method of identifying language translations for source documents, comprising:
    finding source documents containing links to target documents and a link anchor for the links having language indicating text;
    generating a first tuple set for paired source documents and target documents with tuples having an expected target language of a target document;
    annotating the first tuple set with primary languages for the source documents and target documents to form a second tuple set containing tuples where primary languages of the source documents and target documents are different;
    generating a third tuple set using the second tuple set by including a count of a number of times unique link addresses for source documents and target documents occur in the first tuple set;
    removing tuples from the third tuple set containing pairs of source documents and target documents where a count ratio between a source document count and a target document count is less than a reference ratio; and
    extracting document pairs from the third tuple set to provide a list of target documents that are translations of the source documents.

2. The method as in claim 1, further comprising removing tuples from the third tuple set where the count ratio of a source document uniform resource locator (URL) as compared to a target document uniform resource locator (URL) is less than a separator threshold.

3. The method as in claim 1, wherein the reference ratio is set to a pre-determined constant value.

4. The method as in claim 1, wherein the reference ratio is one source document to one target document.

5. The method as in claim 1, wherein target documents remaining in the third tuple set are identified as translations of the source documents.

6. The method as in claim 1, wherein the language indicating text is link anchor text.

7. The method as in claim 1, wherein the language indicating text is alternative text in an image link.

8. The method as in claim 1, wherein the source documents and target documents are web documents.

9. The method as in claim 1, wherein the forming the second tuple set further comprises discarding tuples where an expected source language and the expected target language are identical.

10. The method as in claim 1, further comprising:
    generating an additional tuple set containing unique link addresses from source documents and target documents in the first tuple set and a count for the number of times a link address occurs in the first tuple set; and
    joining the second tuple set and the additional tuple set to form a fourth tuple set where each link address includes a number of times unique link addresses occur in the first tuple set.

11. A system for pairing source documents with translated target documents, the system comprising:

a link mining module to find source documents containing links to target documents, where link anchors in the links have language indicating text for the target documents;

a tuple generation module to generate a first tuple set for corresponding source document and target document pairs along with an expected target language of a translated target document;

an annotation module to annotate the first tuple set with a primary language for the source documents and the target documents and to form a second tuple set containing tuples where the primary languages of the source and target documents are different;

a link count module to generate a third tuple set using the second tuple set by including a count for a number of times each unique link address for source documents and target documents occurs in the first tuple set;

a filtering module to remove tuples from the third tuple set containing pairs of source documents and target documents where a count ratio between a source document count and a target document count is less than a reference ratio, wherein the filtering module can extract document pairs from the third tuple set to provide a list of target documents that are translations of the source documents; and a processor configured to execute at least one of the link mining module, the tuple generation module, the annotation module, the link count module, or the filtering module.

12. The system as in claim 11, wherein the reference ratio is set to a pre-determined constant value.

13. The system as in claim 11, wherein the language indicating text is link anchor text.

14. The system as in claim 11, wherein the source documents and target documents are web documents.

15. The system as in claim 11, wherein forming the second tuple set further comprises discarding tuples where an expected source language and the expected target language are identical.

16. The system as in claim 11, further comprising:
generating an additional tuple set containing unique link addresses from source and target documents in the first tuple set and a count for a number of times the unique link addresses occur in the first tuple set; and joining the additional tuple set and the third tuple set to form a fourth tuple set where each link address includes the count for a link address occurrence in the first tuple set.

17. A method of obtaining language translations for source documents, comprising:

finding source documents containing links to target documents and link anchors in the links having language indicating text;

generating a first tuple set for source documents and target documents pairs, where tuples include an expected target language of a target document;

annotating the first tuple set with primary languages for the source documents and the target documents;

discarding tuples from a second tuple set where the primary languages of the source and target documents are identical or where the primary language for the target document is not the same as the expected target language of the target document;

generating a third tuple set using the second tuple set having a count for a number of times a unique link address for source documents and target documents occurred in the first tuple set;

joining the second tuple set and the third tuple set to produce a fourth tuple set wherein address links are annotated with counts; and removing tuples from the fourth tuple set containing pairs of source documents and target documents where a count ratio between a source document count and a target document count is above a reference ratio.

18. The method as in claim 17, further comprising using a reference ratio set to a pre-determined constant value.

* * * * *